Aug. 7, 1951 C. B. DOTY 2,563,220
SEAT STRUCTURE
Filed March 4, 1946 5 Sheets-Sheet 1

INVENTOR.
Clifford B. Doty.
BY
Elmer Jamison Gray
ATTORNEY.

Aug. 7, 1951  C. B. DOTY  2,563,220
SEAT STRUCTURE
Filed March 4, 1946  5 Sheets-Sheet 2
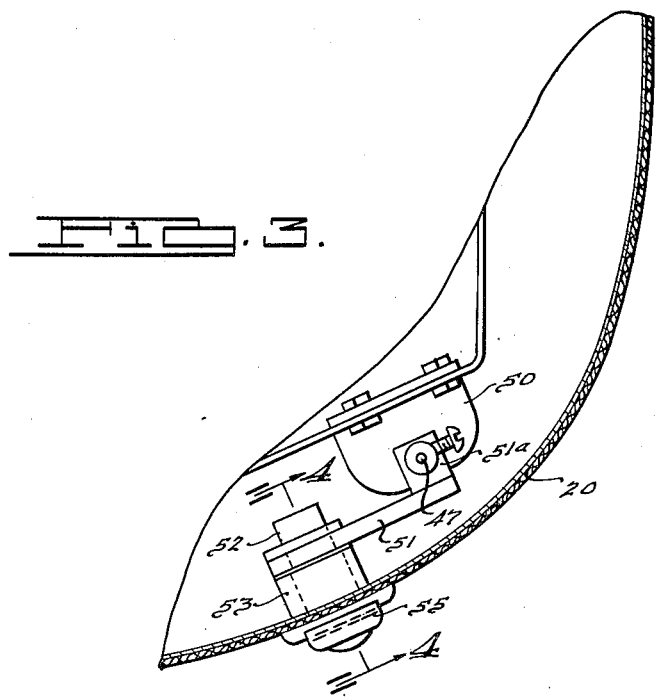
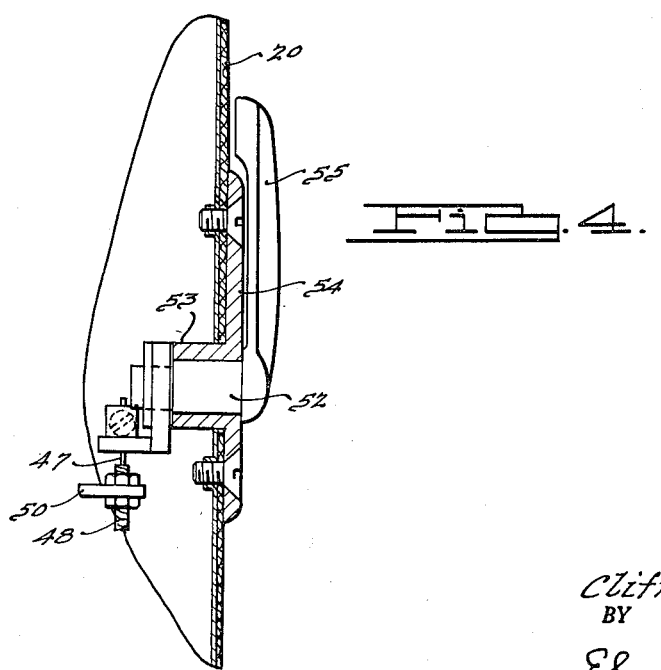
INVENTOR.
Clifford B. Doty.
BY
Elmer Jamison Gray
ATTORNEY.

Aug. 7, 1951     C. B. DOTY     2,563,220
SEAT STRUCTURE
Filed March 4, 1946     5 Sheets-Sheet 3
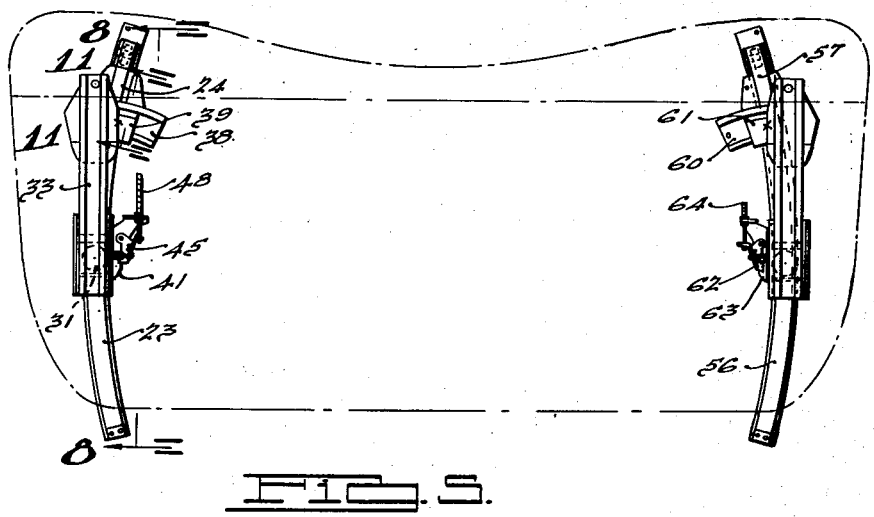
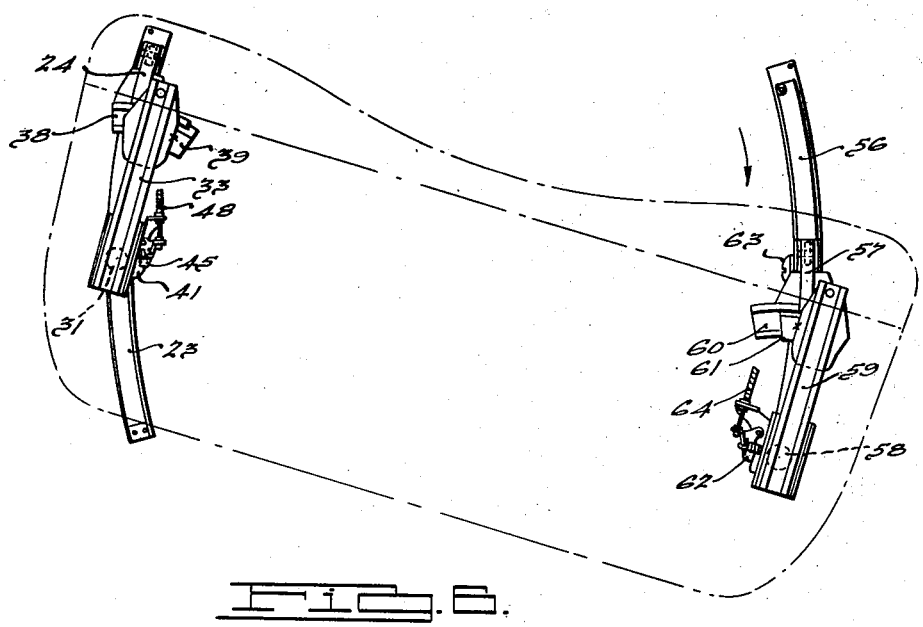
INVENTOR.
Clifford B. Doty.
BY
Elmer Jamison Gray
ATTORNEY.

Aug. 7, 1951 C. B. DOTY 2,563,220
SEAT STRUCTURE
Filed March 4, 1946 5 Sheets-Sheet 4
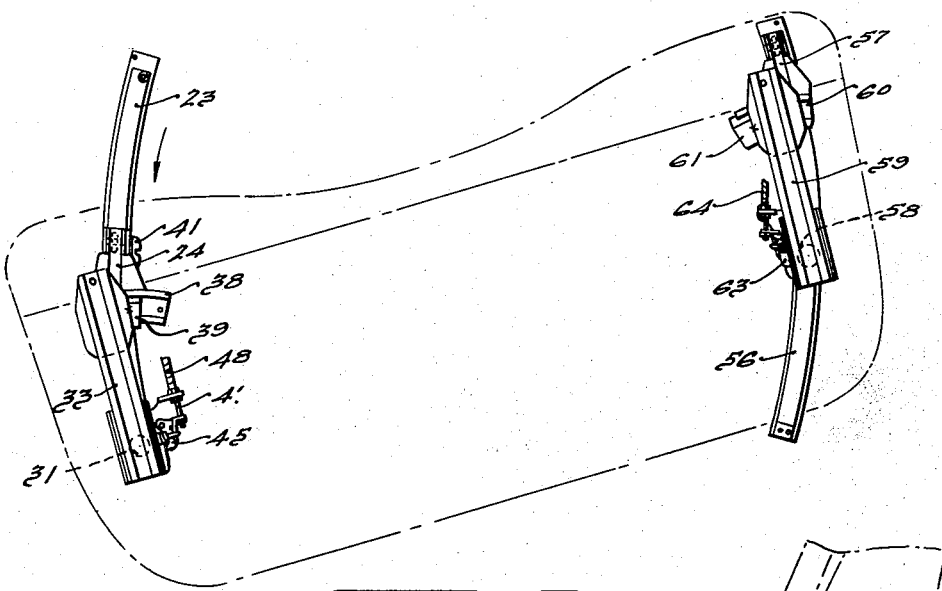
INVENTOR.
Clifford B. Doty,
BY
Elmer Jamison Gray
ATTORNEY.

Aug. 7, 1951 — C. B. DOTY — 2,563,220
SEAT STRUCTURE
Filed March 4, 1946 — 5 Sheets-Sheet 5
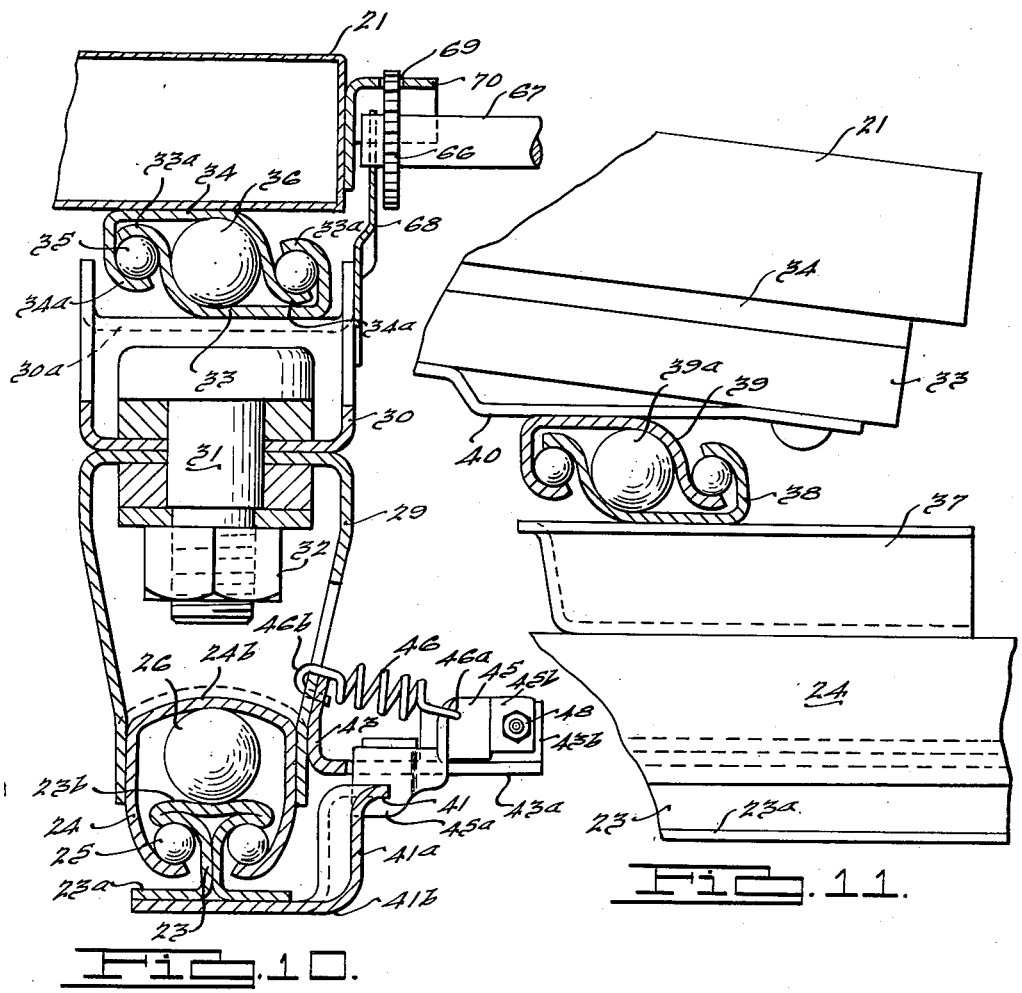
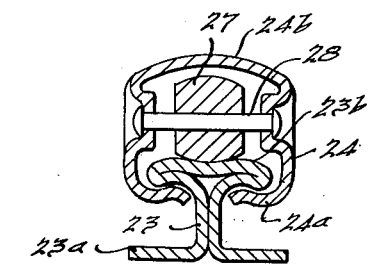
INVENTOR.
Clifford B. Doty.
BY
Elmer Jamison Gray
ATTORNEY.

Patented Aug. 7, 1951

2,563,220

UNITED STATES PATENT OFFICE 2,563,220

SEAT STRUCTURE

Clifford B. Doty, Detroit, Mich., assignor to Briggs Manufacturing Company, Detroit, Mich., a corporation of Michigan Application March 4, 1946, Serial No. 651,857

14 Claims. (Cl. 155—5)

This invention relates to seat structures and more particularly to adjustable seats for vehicle bodies, such as automobile bodies, the invention being especially useful in connection with the front seats of two-door automobiles in which the seats are constructed so as to provide for limited swinging motion in a horizontal direction in order to facilitate access through the door openings of the rear seat passengers.

An object of the invention is to provide an improved seat structure in which the seat is capable of being swung horizontally and selectively in one direction or the other in order to afford access to the rear seat of the vehicle through the doorway at either side of the vehicle.

A further object of the invention is to provide a seat structure embodying means enabling the seat to be adjusted fore and aft by the driver of the automobile while also permitting either end of the seat to be swung horizontally a limited distance to permit a passenger using the rear seat of the vehicle to enter or leave through the front door opening at either side of the vehicle.

Still another object of the invention is to provide a fore and aft slidable front seat pivotally mounted at opposite ends upon slides or the like capable selectively of being shifted forwardly in arcuate paths to move either end of the seat forwardly away from the rear edge of the door opening so as to provide space for a rear seat passenger to enter the vehicle at either side thereof.

A further object of the invention is to provide a front seat for an automobile pivotally mounted at opposite ends and supported so that either end may be swung in a forward direction to facilitate access to the rear of the tonneau, latch means being provided for holding the seat in normal riding position and remote control means accessible to both the front and rear seat passengers also being provided for releasing the latch means.

Still a further object of the invention is to provide a horizontally swingable front seat for an automobile having latch means for holding the seat in normal riding position and a cable remotely controlled at a point on the back of the seat for releasing the latch means.

Other objects of this invention will appear in the following description and appended claims, reference being had to the accompanying drawings forming a part of this specification wherein like reference characters designate corresponding parts in the several views.

Fig. 3 is an enlarged section taken substantially through lines 3—3 of Fig. 1 looking in the direction of the arrows.

Fig. 4 is a section taken substantially through lines 4—4 of Fig. 3 looking in the direction of the arrows.

Figs. 5, 6 and 7 are fragmentary plan views, partly diagrammatic, illustrating various positions of the seat.

Fig. 8 is a fragmentary vertical section taken substantially through lines 8—8 of Fig. 5 looking in the direction of the arrows.

Fig. 9 is a detail plan view of the latch and keeper mechanism for the bottom slide mechanism, the parts in this view being shown in separated condition.

Fig. 10 is an enlarged sectional elevation taken substantially through lines 10—10 of Fig. 8 looking in the direction of the arrows.

Fig. 11 is an enlarged fragmentary side elevation taken substantially through lines 11—11 of Fig. 5 looking in the direction of the arrows.

Fig. 12 is an enlarged section taken substantially through lines 12—12 of Fig. 8 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In accordance with the present preferred embodiment of the invention the front seat of the vehicle is supported on the floor thereof for selective adjustment in three distinct directions. A curvilinear bottom slide mechanism is mounted beneath each end of the seat, these mechanisms being identical but arranged in reverse positions. Each bottom slide mechanism is normally controlled by a latch device preferably remotely releasable, as by means of a manually operable device conveniently located on the back of the seat adjacent one end thereof. Also arranged beneath the seat at each end thereof is a rectilinear top slide mechanism, each such mechanism being trunnioned as a unit to the movable member of the associated bottom slide mechanism. By unlatching the relatively movable members of one bottom slide mechanism the seat may be swung horizontally about the trunnion or pivot at the opposite end of the seat, and vice versa, thus permitting either end of the seat to be selectively swung in a horizontal direction away from the upright rear edge of the adjacent door opening. With both bottom slide mechanisms latched the seat may be shifted fore and aft through the medium of the top slide mechanism, suitable latch means of conventional nature being provided for holding the seat in any desired longitudinally adjusted position. The construction is such that either end of the seat may be swung horizontally to permit access to the rear tonneau of the vehicle regardless of the longitudinally adjusted position that the seat occupies. Furthermore, when either end of the seat is swung back to its normal transverse position, the latch device at that end of the seat will automatically function to lock the seat in position.

Figure 1:
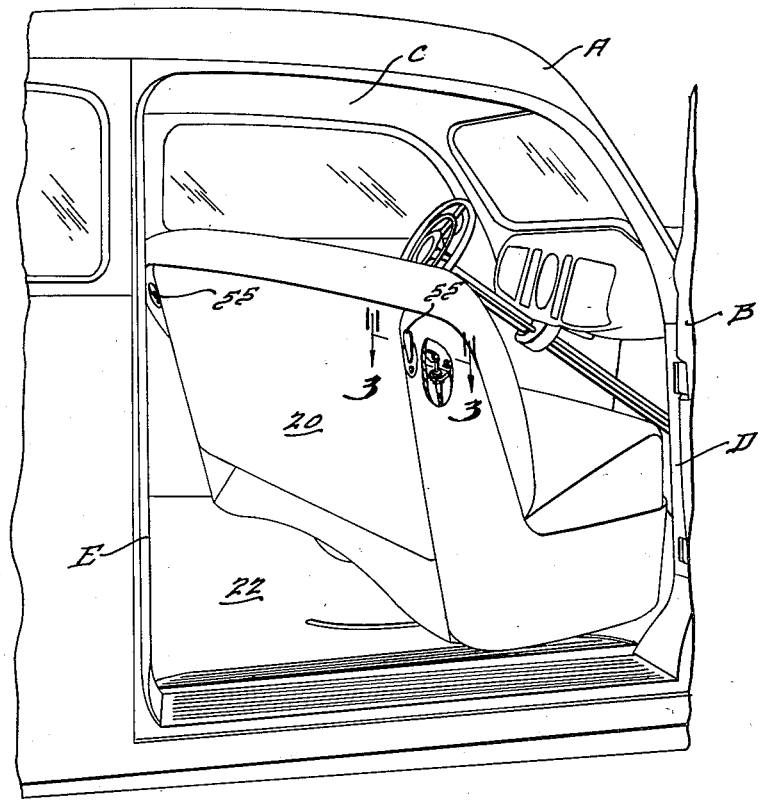
Fig. 1 is a fragmentary side elevation of the front end of an automobile body illustrating the front seat thereof supported for adjustment in accordance with the present invention.
Figure 2:
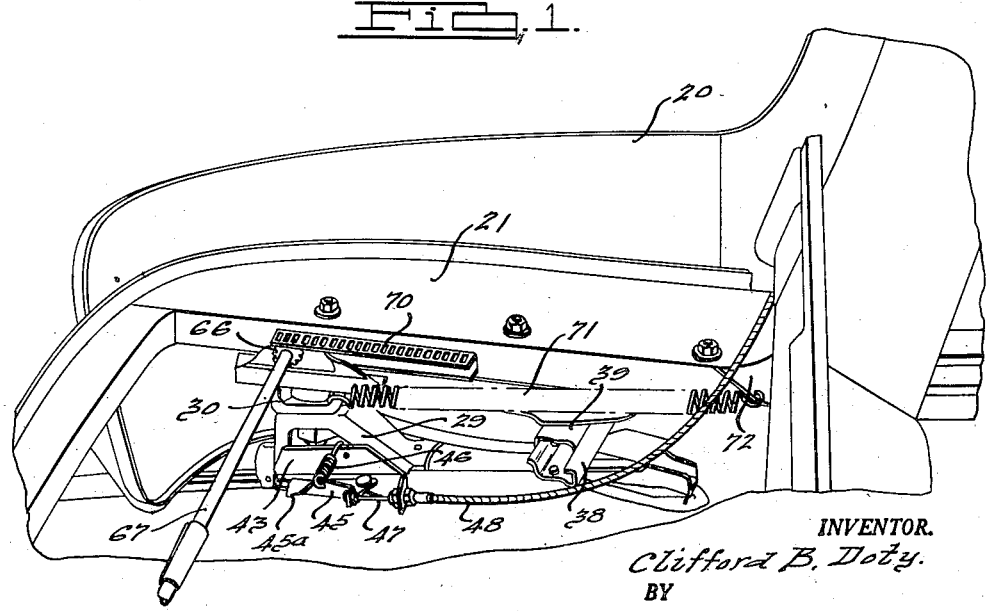
Fig. 2 is a fragmentary perspective view illustrating one of the duplicate supporting and adjusting mechanisms mounted beneath the right-hand end of the seat, the back and seat cushions being removed in this view.

In Fig. 1 there is illustrated an automobile body A having right and left front doors B and C, respectively, which are hinged in the usual manner to the front pillars D of the body. The doors B and C form the usual closures for right and left front door openings, the rear upright edges thereof being defined by center pillars E. Arranged within the body is a front seat 20 which, when occupying its normal transverse position, blocks off the rear of the door opening to such an extent as to render it difficult or impossible for a passenger to enter the rear of the tonneau so as to occupy the rear seat. In accordance with the present invention, however, either end of the seat may be swung forwardly, such as in the manner shown in Fig. 1, so as to provide ample space for the rear seat passengers to enter through either of the front door openings.

The seat 20 is provided with the usual upholstered cushion back and removable seat cushion, the latter being supported on a rectangular base frame which includes longitudinal side members 21. The slide mechanisms embodying the present invention are interposed between the side frame members 21 of the seat and the floor 22 of the vehicle.

Since the slide mechanisms are duplicated at each end of the seat it will suffice to describe in detail only one of these mechanisms, such as the slide mechanisms mounted beneath the seat at the righthand end thereof looking in a forward direction. Referring particularly to Figs. 8 to 12 inclusive, there is secured to the floor 22 of the vehicle a longitudinally extending arcuate rail 23 which is generally T-shaped in cross-section and formed with laterally extending bottom flanges 23a adapted to be bolted to the floor. The top web 23b of the rail 23 forms an arcuate or curvilinear track. Cooperating with the fixed rail 23 is a correspondingly curved slide member 24 in the form of an elongated inverted channel having its lower edges 24a turned inwardly to underlie the laterally projecting side edges of the upper portion of the rail 23. The inturned edges 24a are embossed at selected points to receive bearing balls 25, and interposed between the front end of the slide channel 24 and the web 23b is a large bearing ball 26. The rear end of the slide 24 is supported on the rail 23 by means of a roller 27 carried by a transverse pivot pin 28 secured to the sides of the channel 24. The foregoing construction provides anti-friction bearings between the slide 24 and the rail 23 so as to permit free shiftable movements of the slide 24 along the rail without appreciable frictional resistance. Rigidly secured, as by spot welding, to the forward end of the slide 24 is a generally U-shaped spacer bracket 29 in the form of an inverted channel, and mounted on this bracket is a second channel shaped bracket 30, these brackets being of suitable height so as to give the desired elevation to the front end of the seat. The bracket 30 is adapted to turn horizontally about a vertical axis through the medium of a trunnion or headed pivot stud 31 which passes through the juxtaposed webs of the channel brackets 29 and 30, as illustrated in Fig. 10. The stud 31 is held in position by means of a nut 32 threaded onto the lower end thereof, suitable bearing washers being arranged on the shank of the stud so as to permit free pivotal movement of the channel bracket 30.

Fixed within the upper portion of the channel bracket 30 above the stud or trunnion 31 is a transverse web 30a to the upper side of which is secured, as by spot welding, a longitudinally extending rectilinear rail or track member 33. Cooperating with this track member is a rectilinear slide 34, the members 33 and 34 being suitably flanged at 33a and 34a along their opposite edges for the retention of ball bearings 35. Also interposed between the members 33 and 34 and suitably retained in place are anti-friction ball bearings 36. The slide member 34 is rigidly secured, as by means of bolts, to the bottom of the seat frame member 21. From the foregoing it will be seen that the seat may be shifted fore and aft in a straight line direction and with a minimum of frictional resistance by the cooperation of the slide 34 with the rail or track member 33 and interposed anti-friction bearings.

The rear of the seat at each end thereof is supported on the curvilinear slide member 24 through the medium of curved track or guide mechanism which permits the rear portion of one end of the seat to swing laterally to accommodate the fore and aft swinging motion of the opposite end of the seat. Mounted in fixed position upon the rear end of each curvilinear slide 24 is a spacer bracket 37 and secured, as by spot welding, to the top of this bracket is a relatively short arcuate track member or rail 38. Cooperating with the track or guide member 38 is a short curvilinear slide 39, ball bearings 38a and 39a being interposed between the members 38 and 39 so as to permit lateral sliding motion of the slide 39 with a minimum of frictional resistance. The slide member 39 is rigidly fastened to a bracket 40 riveted to the bottom of the rail 33.

In order to lock each end of the seat so as to maintain the seat in its normal transverse position against accidental swinging motion along the curvilinear rail 23, latch mechanism is provided between the bracket 29 and the rail 23. This latch mechanism includes a laterally projecting keeper 41 having a latch engaging notch 42, see Fig. 9. The keeper is formed from an outwardly turned flange at the upper edge of an angle member 41a having a bottom flange 41b underlying the rail 23 and rigidly secured thereto, as by spot welding. An angle bracket 43 is spot welded to the inner lower side of the bracket 29 and is provided with a laterally extending flange 43a to which is pivoted at 44 a swinging latch member 45. This latch member is formed at its front end with a depending latch or detent portion 45a. The latch 45 is yieldingly held in latching position by means of a tension spring 46, one end 46a of which is hooked into an aperture in the latch 45 and the other end 46b of which is hooked into an aperture in the bracket 29.

Referring to Fig. 9, it will be seen that the keeper 41 is formed with an inclined cam edge 41c located in the path of the latch or detent portion 45a. Hence, when the end of the seat is swung rearwardly to its normal transverse position as shown in Fig. 5, the latch portion 45a will engage the cam edge 41c of the keeper, thus forcing it outwardly against the action of spring 46 until the latch element registers with the keeper notch 42 at which point the spring will automatically force the latch into the notch, thereby locking the bracket 29 to the bottom supporting rail 23.

In accordance with the present embodiment of the invention the latch 45 is adapted to be released or freed from the keeper 41 by remote control mechanism accessible at the back of the seat. This mechanism comprises a Bowden wire 47 anchored at its forward end as at 48 to a projecting flange 45b on the latch 45. The Bowden wire throughout its major length is housed within a hollow armored flexible cable 48, the forward end of which is anchored at 49 to a flange 43b on the bracket 43. As illustrated in Figs. 3 and 4 the Bowden wire 47 passes through a bracket 50 bolted to the back frame of the seat and is secured to a laterally projecting lug 51a integral with one end of a crank arm 51. The opposite end of the crank arm is fastened to a stud 52 rotatable within a bearing 53 projecting through an aperture in the upholstered back of the seat and formed integrally with an escutcheon plate 54 mounted against the exterior of the seat. The stud 52 is attached to the lower end of a finger piece 55. From the foregoing construction it will be seen that by swinging the finger piece 55 the crank arm 51 will be swung in a vertical direction thereby exerting a pull on the Bowden wire 47 and consequently swinging the latch 45 about its pivot 44 to withdraw the latch portion 45a from the keeper notch 42. When the parts are thus released the end of the seat may be swung fore and aft in the manner shown in either Fig. 6 or Fig. 7.

The foregoing description has been directed to the seat adjusting mechanisms positioned at one end of the seat, as shown at the left in Fig. 5. The seat adjusting mechanisms at the opposite end of the seat are identical in construction. They include a bottom curvilinear rail or track member 56 corresponding to the rail or track member 23, a bottom curvilinear slide 57 corresponding to the slide 24, a trunnion 58 corresponding to the trunnion 31, an upper rectilinear rail or track member 59 corresponding to the rail or track member 33, a lateral curved rail or track member 60 corresponding to the rail or track member 38, a lateral curved slide member 61 corresponding to the slide member 39, latch and keeper members 62 and 63 corresponding to the latch and keeper members 45 and 41, and a remote control cable release 64 for the latch 62 corresponding to the cable release 47, 48 for the latch 45. For the sake of clarity the top rectilinear slides 34 have been omitted in Figs. 5, 6 and 7. It will be understood that all of the remaining parts of the adjusting mechanisms at the right in Figs. 5, 6 and 7 are identical in construction with those at the left in said figures. Similar remote control mechanisms for the latches are also provided on the back of the seat at opposite ends thereof.

The top slide mechanism, including the relatively shiftable members 33 and 34, permits fore and aft straight line adjustment of the seat independently of the bottom slide mechanisms which permit selective swinging motion of opposite ends of the seat. It will be understood that the slide members 33 and 34 are automatically latched together so as to maintain any longitudinally adjusted position of the seat by any suitable latch device accessible to the operator of the vehicle and of conventional and well known construction. The usual equalizing mechanism is also provided so as to prevent lateral cocking of the seat during fore and aft adjustment thereof. This mechanism comprises a pinion 66 secured to each end of a cross shaft 67 extending between the side frame members 21 of the seat. The opposite ends of the shaft 67 are revolubly supported within notches in brackets 68 secured, as by spot welding, to the inner sides of the channel brackets 30 at opposite ends of the seat. Each pinion 66 meshes in a series of apertures 69 in a rack member 70 rigidly secured to one of the side frame members 21.

The normal transverse riding position of the seat 20 is indicated in Fig. 5, the longitudinal relation thereof to the steering wheel and foot controls being determined by adjustment of the seat and its attached slides 34 relative to the rails or tracks 33. When a passenger desires to enter the lefthand front door opening in order to occupy the rear seat, the finger piece 55 at the lefthand end of the seat is swung to release the latch 62 from its keeper 63, whereupon the lefthand end of the seat may be swung forwardly in the manner shown in Fig. 6. During this operation the seat swivels about the vertical axis of trunnion or pivot 31 and the slide 39 shifts laterally on the curved track 38. Adequate space is thus afforded for the passenger to enter the lefthand door opening into the rear tonneau of the vehicle. Upon retracting the end of the seat to the normal riding position of Fig. 5 the latch 62 will automatically engage in the notch in the keeper 63 in the same manner as described in connection with Fig. 9.

When the rear seat passenger desires to enter through the righthand door opening, the latch 45 is disengaged from the keeper 41 by swinging the finger piece 55 at the righthand end of the seat back, whereupon the seat may be swung forwardly in the manner shown in Figs. 1 and 7. During this operation the opposite end of the seat swivels about the trunnion 31 and the slide 39 shifts laterally on the curved track 39.

It will be understood that the track 23 and slide 24 are arcuate with their centers of curvature at the trunnion or pivot 58. The track 38 and slide 39 are also arcuate and have their centers of curvature at the pivot 31. In like manner the centers of curvature of the track and slide 56, 57 are at the pivot 31, and the centers of curvature of the track and slide 60, 61 are at the pivot 58. When the seat 20 is shifted forwardly in a rectilinear path by cooperation of the guide mechanism 34, 33 at one end of the seat and the corresponding mechanism at the opposite end of the seat this action is assisted by means of a coil tension spring 71 connected at its forward end to the bracket 30 and at its rear end to a bracket 72 attached to the rear seat frame.

I claim:

1. A seat structure for a vehicle body, comprising a seat, a slide mechanism mounted beneath each end of the seat in supporting relation thereto, each mechanism comprising an arcuate track and an arcuate slide cooperable therewith, and means for pivotally connecting each end of the seat to a slide to permit the opposite end of the seat to be swung fore and aft about a vertical axis coincident with such pivotal connection.

2. A seat structure for a vehicle body, comprising a seat, a slide mechanism mounted beneath each end of the seat in supporting relation thereto, each mechanism comprising an arcuate track and an arcuate slide cooperable therewith, means for pivotally connecting each end of the seat to a slide to permit the opposite end of the seat to be swung fore and aft about a vertical axis coincident with such pivotal connection, and releasable latch means for locking together each slide and its associated track against relative movement.

3. A seat structure for a vehicle body, comprising a seat, supporting mechanism for the seat mounted beneath each end thereof, each mechanism including members one shiftable relatively to the other in a curvilinear path, and means for pivotally connecting each end of the seat to one of said shiftable members to permit the opposite end of the seat to be swung horizontally fore and aft.

4. A seat structure for a vehicle body, comprising a seat, supporting mechanism for the seat mounted beneath each end thereof, each mechanism including members one shiftable relatively to the other in a curvilinear path, means for pivotally connecting each end of the seat to one of said shiftable members to permit the opposite end of the seat to be swung horizontally fore and aft, and releasable latch means for locking together the members of each of said mechanisms against relative shiftable movement in a fore and aft direction.

5. A seat structure for a vehicle body, comprising a seat, supporting mechanism for the seat mounted beneath each end thereof, each mechanism including members one shiftable relatively to the other in a curvilinear path, means for pivotally connecting each end of the seat to one of said shiftable members to permit the opposite end of the seat to be swung horizontally fore and aft, a latch device pivoted upon one of the members of each of said mechanisms and engageable with the other member for locking said members together, a cable connected to said device, and manually operable means for shifting said cable to swing the latch device into unlatching position.

6. A seat structure for a vehicle body, comprising a seat, supporting mechanism for the seat mounted beneath each end thereof, each mechanism including members one shiftable relatively to the other in a curvilinear path, means for pivotally connecting each end of the seat to one of said shiftable members to permit the opposite end of the seat to be swung horizontally fore and aft, a spring controlled latch device pivoted upon one of the members of each of said mechanisms and engageable with the other member for locking said members together, a flexible cable connected to said device, and manually operable swingable lever means adapted to be mounted on the back of the seat for swinging said device into unlatching position.

7. A seat structure for a vehicle body, comprising a seat, a slide mechanism mounted beneath each end of the seat in supporting relation thereto, each mechanism comprising an arcuate track and an arcuate slide cooperable therewith, means for pivotally connecting each end of the seat to a slide to permit the opposite end of the seat to be swung fore and aft about a vertical axis coincident with such pivotal connection, cooperating means on each slide and its associated track for locking the same together against relative movement and including a spring controlled latch device, a cable connected to each latch device, and means on the back of the seat connected to said cables for shifting the same to selectively swing each latch device into unlatching position.

8. A seat structure for a vehicle body, comprising a seat, a slide mechanism mounted beneath each end of the seat in supporting relation thereto, each mechanism comprising an arcuate track and an arcuate slide cooperable therewith, means for pivotally connecting each end of the seat to a slide at a point adjacent the front end of such slide to permit the opposite end of the seat to be swung fore and aft about said pivotal connection, and guide means interposed between the rear end of each slide and the seat for guiding the rear portion of one end of the seat in a curvilinear path when the opposite end of the seat is swung fore and aft.

9. A seat structure for a vehicle body, comprising a seat, a slide mechanism mounted beneath each end of the seat in supporting relation thereto, each mechanism comprising an arcuate track and an arcuate slide cooperable therewith, means for pivotally connecting each end of the seat to a slide at a point adjacent the front end of such slide to permit the opposite end of the seat to be swung fore and aft about said pivotal connection, guide means interposed between the rear end of each slide and the seat for guiding the rear portion of one end of the seat in a curvilinear path when the opposite end of the seat is swung fore and aft, and releasable latch means for locking together each slide and its associated track against relative movement.

10. A seat structure for a vehicle body, comprising a seat, a slide mechanism mounted beneath each end of the seat in supporting relation thereto, each mechanism comprising an arcuate track and an arcuate slide cooperable therewith, means for pivotally connecting each end of the seat to a slide to permit the opposite end of the seat to be swung fore and aft about a vertical axis coincident with such pivotal connection, releasable latch means for locking together each slide and its associated track against relative movement, manually operable lever means adapted to be mounted on the back of the seat, and flexible cable means connecting said lever means and latch means for releasing the latter upon actuating said lever means.

11. A seat structure for a vehicle body, comprising a seat, supporting mechanism for the seat mounted beneath each end thereof, each mechanism including members one shiftable relatively to the other in a curvilinear path, means for pivotally connecting each end of the seat to one of said shiftable members to permit the opposite end of the seat to be swung horizontally fore and aft, releasable latch means for locking together the members of each of said mechanisms against relative shiftable movement in a fore and aft direction, manually operable lever means adapted to be mounted on the back of the seat, and flexible cable means connecting said lever means and latch means for releasing the latter upon actuating said lever means.

12. A seat structure for a vehicle body, comprising a seat, bottom supporting mechanism for the seat mounted beneath each end thereof comprising members one shiftable relatively to the other in a curvilinear path, a swingable member arranged beneath each end of the seat and pivotally connected to the shiftable member of the associated bottom supporting mechanism to permit the opposite end of the seat to be swung about a vertical axis coincident with such pivotal connection, and fore and aft slidable means for connecting said seat to said swingable member.

13. A seat structure for a vehicle body, comprising a seat, bottom supporting mechanism for the seat mounted beneath each end thereof comprising members one shiftable relatively to the other in a curvilinear path, a swingable member arranged beneath each end of the seat and pivotally connected to the shiftable member of the associated bottom supporting mechanism to permit the opposite end of the seat to be swung about a vertical axis coincident with such pivotal connection, and a member attached to each end of the seat and slidably connected to each of said swingable members.

14. A seat structure for a vehicle body, comprising a seat, bottom supporting mechanism for the seat mounted beneath each end thereof comprising members one shiftable relatively to the other in a curvilinear path, a swingable member arranged beneath each end of the seat and pivotally connected to the shiftable member of the associated bottom supporting mechanism adjacent the front end of such shiftable member to permit the opposite end of the seat to be swung about a vertical axis coincident with such pivotal connection, and fore and aft slidable means for connecting said seat to said swingable member.

CLIFFORD B. DOTY.

REFERENCES CITED

The following references are of record in the file of this patent:

UNITED STATES PATENTS

| Number | Name | Date |
| --- | --- | --- |
| 859,463 | Salquist | July 9, 1907 |
| 1,942,070 | Smelkir | Jan. 2, 1934 |
| 1,988,638 | Van Deest | Jan. 22, 1935 |
| 2,189,396 | Greig | Feb. 6, 1940 |
| 2,242,247 | Grant | May 20, 1941 |
| 2,256,023 | Harmon | Sept. 16, 1941 |